(12) United States Patent
Lee et al.

(10) Patent No.: US 12,264,379 B2
(45) Date of Patent: Apr. 1, 2025

(54) STEEL WIRE ROD HAVING EXCELLENT SPHEROIDIZING HEAT TREATMENT PROPERTIES AND METHOD OF MANUFACTURING SAME

(71) Applicant: POSCO, Pohang-si (KR)

(72) Inventors: Sang-Yoon Lee, Gyeongsangbuk-do (KR); In-Gyu Park, Gyeongsangbuk-do (KR); Jae-Seung Lee, Gyeongsangbuk-do (KR); Byoung-Gab Lee, Gyeongsangbuk-do (KR)

(73) Assignee: POSCO, Pohang-si (KR)

( * ) Notice: Subject to any disclaimer, the term of this patent is extended or adjusted under 35 U.S.C. 154(b) by 409 days.

(21) Appl. No.: 17/786,060

(22) PCT Filed: Dec. 20, 2019

(86) PCT No.: PCT/KR2019/018206
§ 371 (c)(1),
(2) Date: Jun. 16, 2022

(87) PCT Pub. No.: WO2021/125407
PCT Pub. Date: Jun. 24, 2021

(65) Prior Publication Data
US 2023/0027056 A1    Jan. 26, 2023

(51) Int. Cl.
| | | |
|---|---|---|
| *C21D 9/52* | (2006.01) | |
| *C21D 1/02* | (2006.01) | |
| *C21D 1/18* | (2006.01) | |
| *C21D 1/32* | (2006.01) | |
| *C21D 6/00* | (2006.01) | |
| *C21D 8/06* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/28* | (2006.01) | |
| *C22C 38/32* | (2006.01) | |

(52) U.S. Cl.
CPC .............. *C21D 9/525* (2013.01); *C21D 1/02* (2013.01); *C21D 1/18* (2013.01); *C21D 1/32* (2013.01); *C21D 6/002* (2013.01); *C21D 6/005* (2013.01); *C21D 8/06* (2013.01); *C21D 8/065* (2013.01); *C22C 38/001* (2013.01); *C22C 38/02* (2013.01); *C22C 38/04* (2013.01); *C22C 38/06* (2013.01); *C22C 38/28* (2013.01); *C22C 38/32* (2013.01); *C21D 2211/005* (2013.01); *C21D 2211/009* (2013.01); *Y02P 10/25* (2015.11)

(58) Field of Classification Search
CPC . C21D 9/525; C21D 1/02; C21D 1/18; C21D 1/32; C21D 6/002; C21D 6/005; C21D 8/06; C21D 8/065; C21D 2211/005; C21D 2211/009; C22C 38/001; C22C 38/02; C22C 38/04; C22C 38/06; C22C 38/28; C22C 38/32; Y02P 10/25

See application file for complete search history.

(56) References Cited

U.S. PATENT DOCUMENTS

| | | |
|---|---|---|
| 6,488,787 B1 | 12/2002 | Ochi et al. |
| 2012/0118443 A1 | 5/2012 | Lee et al. |
| 2013/0037180 A1* | 2/2013 | Sano ................ C22C 38/04 148/333 |
| 2014/0076469 A1 | 3/2014 | Kobayashi et al. |
| 2017/0114434 A1* | 4/2017 | Kohtake .............. C22C 38/08 |
| 2017/0314107 A1 | 11/2017 | Matsui et al. |
| 2017/0335426 A1 | 11/2017 | Matsui et al. |
| 2018/0298464 A1 | 10/2018 | Mun et al. |
| 2018/0347019 A1 | 12/2018 | Sano et al. |

FOREIGN PATENT DOCUMENTS

| | | |
|---|---|---|
| CN | 101365819 A | 2/2009 |
| CN | 102712980 A | 10/2012 |
| CN | 108220773 A | 6/2018 |
| CN | 109234508 A | 1/2019 |
| JP | 2001-011575 A | 1/2001 |
| JP | 2004-190127 A | 7/2004 |
| JP | 2005-133152 A | 5/2005 |
| JP | 2005-146395 A | 6/2005 |

(Continued)

OTHER PUBLICATIONS

KR-2007068511-A: Espacenet English machine translation cited and attached (Year: 2007).*
International Search Report dated Sep. 11, 2020 issued in International Patent Application No. PCT/KR2019/018206 (with English translation).
Japanese Office Action dated Aug. 1, 2023 issued in Japanese Patent Application No. 2022-537809.

(Continued)

*Primary Examiner* — Adil A. Siddiqui
(74) *Attorney, Agent, or Firm* — Morgan, Lewis & Bockius LLP

(57) ABSTRACT

An embodiment of the present invention provides a wire rod and a method of manufacturing same. The wire rod comprises, by weight %, 0.3-0.5 wt % of C, 0.02-0.4 wt % of Si, 1.0-1.5 wt % of Mn, 0.3-0.7 wt % of Cr, 0.003 wt % or less (exclusive of 0 wt %) of B, less than 0.03 wt % (exclusive of 0 wt %) of Ti, 0.03 wt % or less (inclusive of 0 wt %) of P, 0.01 wt % or less (inclusive of 0 wt %) of S, 0.02-0.05 wt % of Al, 0.001-0.01 wt % of N, and the balance being Fe and inevitable impurities, wherein a microstructure is a complex structure having a main phase of ferrite+pearlite, with at least one of bainite or martensite accounting for 5 area % or less (inclusive of 0%), and has a cementite average aspect ratio of 35 or less in an area covering $\frac{2}{5}$-$\frac{3}{5}$ of the diameter.

9 Claims, No Drawings

(56) References Cited

FOREIGN PATENT DOCUMENTS

| | | | | |
|---|---|---|---|---|
| JP | 2006-265583 A | 10/2006 | | |
| JP | 2007-162128 A | 6/2007 | | |
| JP | 2009-527638 A | 7/2009 | | |
| JP | 2010-053426 A | 3/2010 | | |
| JP | 2013-007089 A | 1/2013 | | |
| JP | 2018-537584 A | 12/2018 | | |
| KR | 10-2007-0068511 A | 7/2007 | | |
| KR | 2007068511 A | * 7/2007 | ........... | C22C 38/001 |
| KR | 10-2011-0033534 A | 3/2011 | | |
| KR | 10-2015-0029757 A | 3/2015 | | |
| KR | 10-2017-0072995 A | 6/2017 | | |
| KR | 10-2018-0130638 A | 12/2018 | | |
| KR | 10-2020-0063385 A | 6/2020 | | |
| WO | 2007/074986 A1 | 7/2007 | | |
| WO | 2015/189978 A1 | 12/2015 | | |
| WO | 2019/088552 A1 | 5/2019 | | |

OTHER PUBLICATIONS

Chinese Office Action dated Feb. 11, 2023 issued in Chinese Patent Application No. 201980103064.5 (with English translation).
Extended European Search Report dated Feb. 23, 2023 issued in European Patent Application No. 19956224.0.

* cited by examiner

STEEL WIRE ROD HAVING EXCELLENT SPHEROIDIZING HEAT TREATMENT PROPERTIES AND METHOD OF MANUFACTURING SAME

CROSS-REFERENCE OF RELATED APPLICATIONS

This application is the U.S. National Phase under 35 U.S.C. § 371 of International Patent Application No. PCT/KR2019/018206, filed on Dec. 20, 2019, the entire disclosure of which is incorporated by reference herein.

TECHNICAL FIELD

The present disclosure relates to a steel wire rod having spheroidizing heat treatment properties, and a method of manufacturing the same.

BACKGROUND ART

Boron steel is an economical material that can reduce expensive alloying elements such as Cr and Mo by improving hardenability of steel by adding a small amount of inexpensive boron. 800 MPa class boron steel having low tensile strength, has low tensile strength due to non-addition of alloying elements for improving the strength, so a spheroidizing heat treatment can be omitted, but the steel has limitations in hardenability, which limits its use in large-diameter materials. High-strength products over 1000 MPa and large-diameter materials add a lot of alloying elements such as Cr and Mn, which increases the tensile strength of the steel wire rod and requires a spheroidizing heat treatment.

Patent Document 1 is a representative technology of 800 MPa class boron steel. In Patent Document 1, it is intended that toughness of steel be improved by refining a ferrite grain size and increasing a fraction in a hot-rolled steel bar. However, due to limitations of a Cr content, there is a limitation in hardenability, which limits use thereof in large-diameter steel bars.

In order to improve this problem, in Patent Document 2, Cr, Mo, or the like, were added, and boron steel having a microstructure including ferrite was developed to improve induction hardenability. However, since ferrite is a structure that is difficult to be austenitized during austenizing heat treatment, in order to use a short heat treatment such as induction heat treatment, there is a disadvantage in that a ferrite phase fraction included in an initial microstructure of the steel wire rod must be reduced as much as possible. In addition, in this method, to increase a finish rolling temperature to keep the ferrite fraction as low as possible, the strength of the steel wire rod increases, and accordingly, it is inevitably adversely affected in terms of workability.

PRIOR ART DOCUMENT (Reference 1) Japanese Laid-Open Patent Publication No. 2010-053426
(Reference 2) Japanese Laid-Open Patent Publication No. 2005-133152

DISCLOSURE

Technical Problem

An aspect of the present disclosure is to provide a steel wire rod having excellent spheroidizing heat treatment properties and a method of manufacturing the same.

Technical Solution

According to an aspect of the present disclosure, a steel wire rod having excellent spheroidizing heat treatment properties includes, by weight %: 0.3-0.5% of C, 0.02-0.4% of Si, 1.0-1.5% of Mn, 0.3-0.7% of Cr, 0.003% or less (excluding 0%) of B, less than 0.03% (excluding 0%) of Ti, 0.03% or less (including 0%) of P, 0.01% or less (including 0%) of S, 0.02-0.05% of Al, 0.001-0.01% of N, and a balance of Fe and inevitable impurities, wherein a microstructure is a complex structure having a main phase of ferrite+pearlite, with one or more of bainite or martensite accounting for 5 area % or less (including 0%), and has an average aspect ratio of cementite of 35 or less in a region at a ⅖-⅗ point of a diameter.

According to another aspect of the present disclosure, a method of manufacturing a steel wire rod having excellent spheroidizing heat treatment properties includes operations of: preparing a billet including, by weight %, 0.3-0.5% of C, 0.02-0.4% of Si, 1.0-1.5% of Mn, 0.3-0.7% of Cr, 0.003% or less (excluding 0%) of B, less than 0.03% (excluding 0%) of Ti, 0.03% or less (including 0%) of P, 0.01% or less (including 0%) of S, 0.02-0.05% of Al, 0.001-0.01% of N, and a balance of Fe and inevitable impurities; heating the billet, and then extracting the billet at 950 to 1050° C.; performing secondary hot rolling the extracted billet to obtain a steel wire rod; and cooling the steel wire rod to 2° C./sec or less, wherein the secondary hot rolling includes operations of: performing intermediate finishing rolling on the extracted billet; and performing finishing rolling at 730° C.-Ae3 above a critical deformation amount expressed by the following relational expression 1, [Relational expression 1] critical deformation amount=−2.46 $Ceq^2$+3.11 Ceq−0.39 (where, Ceq=C+Mn/6+Cr/, wherein C, Mn, and Cr are expressed by weight %).

Advantageous Effects

According to one aspect of the present disclosure, it is possible to provide a steel wire rod capable of increasing a spheroidization rate of cementite during spheroidizing heat treatment and a method for manufacturing the same.

BEST MODE FOR INVENTION

In the description below, a steel wire rod having excellent spheroidizing heat treatment properties according to an embodiment of the present disclosure will be described. First, an alloy composition of the present disclosure will be described. The content of the alloy composition described below is represented by weight % unless otherwise indicated.

C: 0.3-0.5%

When the content of C exceeds 0.5%, it is difficult to obtain sufficient strength, toughness, and ductility because retained austenite is excessively generated during quenching and tempering heat treatment after spheroidizing heat treatment and a forging process are performed. Meanwhile, boron steel having a C content of less than 0.3% has sufficiently low tensile strength, so that separate spheroidizing heat treatment is not required. In the present disclosure, boron steel that requires spheroidizing heat treatment is used as target steel, and in order to accelerate a spheroidization rate of cementite, the C content is controlled to 0.3% or more. Therefore, the content of C is preferably in a range of 0.3 to 0.5%.

Si: 0.02-0.4%

Si is an element added to secure a certain level of strength. When the Si content is less than 0.02%, the strength improvement effect is not sufficient, and when the Si content exceeds 0.4%, a solid solution strengthening effect is excessively high, which may be disadvantageous in securing workability of steel. Therefore, the content of Si preferably has a range of 0.02 to 0.4%. A lower limit of the Si content may be more preferably 0.04%, and an upper limit of the Si content may be more preferably 0.3%.

Mn: 1.0-1.5%

Mn is an element added to improve hardenability. When the content of Mn is less than 1.0%, it may be difficult to obtain sufficient hardenability due to insufficient hardenability, such that it may be difficult to obtain sufficient strength during quenching and tempering heat treatment after spheroidizing heat treatment and a forging process. When the content of Mn exceeds 1.5%, there may be a concern that a low-temperature structure may be generated when manufacturing a steel wire rod due to excessive hardenability. Since the low-temperature may cause internal cracks in a subsequent drawing process, it is desirable to limit a content thereof. Therefore, the content of Mn is preferably in the range of 1.0 to 1.5%. The Mn content is preferably between 1.0 and 1.3%. This is because, in general, since Mn is element that is easily segregated during a casting process, when a desired level of hardenability is satisfied, it is advantageous to control deviation of the steel by maintaining the Mn content to be low.

Cr: 0.3-0.7%

Similarly to Mn, Cr may mainly be used as an element for enhancing hardenability of steel. When the content of Cr is lower than 0.3%, hardenability of steel is insufficient, such that hardenability of a central portion of a large-diameter material is insufficient. When the hardenability of steel exceeds 0.7%, low-temperature structure bands may occur during the steel wire rod manufacturing process due to the presence of segregation zones inside the steel, and cracks may occur in a subsequent drawing process. Therefore, the content of Cr is preferably within a range of 0.3 to 0.7%, and more preferably within a range of 0.3 to 0.6%.

B: 0.003% or Less (Excluding 0%)

B is an element added to improve hardenability. When the content of B exceeds 0.003%, since the B forms $Fe_{23}(C,B)_6$, an amount of free boron decreases and the hardenability of the steel decreases. Therefore, the content of B is preferably in a range of 0.003% or less.

Ti: 0.03% or Less (Excluding 0%)

Ti is an element added to fix nitrogen in order to maximize an effect of boron for improving hardenability. When the content of Ti exceeds 0.03%, crystallization of TiN in molten steel occurs, making it difficult to achieve an original purpose of adding titanium to fix nitrogen in the steel. Accordingly, the content of Ti is preferably in a range of 0.03% or less. A lower limit of the Ti content may be more preferably 0.01%, and even more preferably 0.015%. An upper limit of the Ti content may more preferably be 0.025%.

P: 0.03% or Less (Including 0%)

P is an impurity contained inevitably in steel, and when a content of P exceeds 0.03%, P segregates at an austenite grain boundary, causing grain boundary brittleness, and there is a concern of low-temperature impact toughness of steel being reduced. Therefore, the content of P may be more preferably in a range of 0.03% or less. The lower the content of P, the more advantageous it is to secure soundness of the steel, so it may be more preferably 0.02% or less, and even more preferably 0.015% or less.

S: 0.01% or Less (Including 0%)

S is an impurity that is inevitably contained in steel, and when a content of S exceeds 0.01%, excessive MnS is generated and adversely affects impact toughness of steel. Therefore, the content of S is preferably in the range of 0.01% or less. The content of S may be more preferably 0.007% or less, and even more preferably 0.005% or less.

Al: 0.02-0.05%

Al is an element that forms AlN to generate austenite grains. When the content of Al is less than 0.02%, AlN is not sufficiently formed due to a small amount of dissolved Al, which makes it difficult to obtain the above-described effect sufficiently. When the content of Al exceeds 0.05%, the aluminum oxide in steel grows excessively, which may affect toughness of steel. Therefore, the content of Al may be preferably in a range of 0.02 to 0.05%.

N: 0.001-0.01%

N improves an effect of boron for improving hardenability by reacting with Ti to form TiN, and is an element that affects formation of austenite grains by reacting with Al in steel to form AlN. When the content of N exceeds 0.01%, N is combined with boron to form BN, thereby reducing a role of boron added for hardenability, and also increasing a concentration of dissolved nitrogen to increase strength during processing. Meanwhile, the lower the N content is, the better, but in order to control the N content to less than 0.001%, an excessive denitrification process is required, which leads to an increase in process costs. Therefore, the content of N may be preferably in a range of 0.001 to 0.01%. The N content may be more preferably 0.001 to 0.005%, and even more preferably 0.001 to 0.003%.

A remainder of the present disclosure may be iron (Fe). However, in a general manufacturing process, inevitable impurities may be inevitably added from raw materials or an ambient environment, and thus, impurities may not be excluded. A person skilled in the art of a general manufacturing process may be aware of the impurities, and thus, the descriptions of the impurities may not be provided in the present disclosure.

Preferably, a microstructure of the steel wire rod of the present disclosure may be a composite structure of ferrite+pearlite. Simply in terms of spheroidization of steel, bainite steel with fine cementite may be advantageous, but it has been reported that cementite spheroidized from bainite may be extremely fine such that growth thereof may be extremely slow. Thus, a ferrite+pearlite+bainite composite structure may be disadvantageous in terms of structure homogenization. Therefore, in the present disclosure, by controlling the microstructure of the steel wire rod to be a composite structure of ferrite+pearlite, spheroidizing heat treatment properties may improve, and also the structure may be further homogenized. In this case, the fraction of ferrite may preferably be 50 area % or more, and the ferrite fraction is less than 50 area %, a pearlite phase fraction is relatively reduced, thereby affecting the pearlite colony size, such that it may be difficult to effectively secure spheroidization heat treatment properties. In particular, even with the same ferrite phase fraction, if the ferrite grain size is fine, the colony size may be further refined. Meanwhile, in the present disclosure, a low-temperature structure which may inevitably be formed during manufacturing, one or more of bainite or martensite, for example, may be included by 5 area % or less. That is, a microstructure in the present disclosure may be a composite structure in which a main phase may be ferrite+ pearlite, and may include 5 area % or less (including 0%) of one or more of bainite or martensite.

The steel wire rod of the present disclosure preferably has an average aspect ratio of cementite of 35 or less. By controlling the average aspect ratio of cementite to be small as described above, it is possible to increase a spheroidization rate of cementite during the spheroidizing heat treatment.

In addition, the average grain size of ferrite is preferably 5 μm or less. As described above, by finely controlling the average grain size of ferrite, the spheroidization rate of cementite during the spheroidizing heat treatment may be increased.

Meanwhile, in the present disclosure, the average aspect ratio of cementite and the average grain size of ferrite may be in a central portion of a diameter of the steel wire rod, for example, may be in a region at a ⅖ to ⅗ point from a surface based on the diameter. In general, since a surface layer portion of the steel wire rod receives strong rolling force during rolling, the average aspect ratio of cementite and the average grain size of ferrite in the surface layer portion may be fine. However, in the present disclosure, it is possible to effectively increase a spheroidization rate of cementite during spheroidization heat treatment by refining the average aspect ratio of cementite and the average grain size of ferrite to the central portion as well as the surface layer portion of the steel wire rod.

In the steel wire rod of the present disclosure provided as described above, an average aspect ratio of cementite after spheroidizing heat treatment is performed once may be 2.5 or less. In general, it is widely known that the spheroidizing heat treatment is effective in spheroidizing cementite as the number of treatments increases. However, in the present disclosure, cementite can be sufficiently spheroidized only by performing the spheroidizing heat treatment once. Meanwhile, as described above, since a surface layer portion of the steel wire rod receives strong rolling force during rolling, the spheroidization of cementite can also proceed smoothly. However, in the present disclosure, for example, cementite in a region at an ¼-½ point from a central portion with reference to a diameter of the steel wire rod, that is, ¼ point-½ point from the surface with reference to the diameter may also be sufficiently spheroidized, so that the average aspect ratio of cementite at the central portion of the steel wire rod can be 2.5 or less. In addition, in order to spheroidize cementite, a processing process before spheroidization heat treatment is usually performed in order to segment the microstructure, and the steel wire rod of the present disclosure can effectively increase the spheroidization rate of cementite without such a processing process.

In the description below, a method of manufacturing a steel wire rod having excellent spheroidizing heat treatment properties according to an embodiment of the present disclosure will be described.

First, a billet having the alloy composition described above is prepared. The operation of preparing the billet may include operations of: heating a steel material at 1200° C. or higher for 60 minutes or more, and then performing primary hot rolling to obtain a billet; air cooling the billet to 150 to 500° C.; and cooling the air-cooled billet to room temperature at a cooling rate of 5 to 30° C./sec.

A steel material is heated at 1200° C. or higher for 60 minutes or more, and then is subjected to primary hot rolling to obtain a billet. The steel material described above may be one of a slab, bloom, and a billet having a relatively large size, and the primary hot rolling is preferably plate rolling to reduce the size or thickness of the steel material. In Boron steel, Ti serves to increase a free B content by preventing N from combining with B by fixing N, and in the present disclosure, the steel material is heated as described above to grow TiN to make sufficient free B. When the billet heating temperature is less than 1200° C. or when the billet heating time is less than 60 minutes, TiN may be stabilized so that TiN growth may not occur sufficiently.

Meanwhile, after the steel material is heated, the steel material may have an average size of TiN of 500 μm or more. When the average of TiN is less than 500 μm, a free B increasing effect cannot be sufficiently obtained.

Thereafter, the billet is air-cooled to 150 to 500° C. When the billet air cooling stop temperature exceeds 500° C., other precipitates other than TiN may grow and cause cracks or breakage of the steel wire rod during a rolling process, and when the temperature is less than 150° C., productivity may decrease.

Thereafter, the air-cooled billet is cooled to room temperature at a cooling rate of 5 to 30° C./sec. The billet cooling is for improving productivity, and at a temperature of less than 150° C., a concern of generating cracks is reduced even if the billet cooling rate is increased to 5° C./sec or more. The billet cooling rate is more preferably 10° C./sec or more, even more preferably 15° C./sec or more, and most preferably 20° C./sec or more. However, when the billet cooling rate exceeds 30° C./sec, the concern of occurring cracks may increase due to the excessive cooling rate.

Meanwhile, the cooled billet may include 80 area % or more of TiN in all precipitates excluding oxidative inclusions. Thus, by forming a large amount of TiN as described above, an effect of improving hardenability by B can fully be obtained. The oxidative inclusions may be, for example, $Al_2O_3$, $SiO_2$, or the like. The TiN fraction is more preferably 90 area % or more.

Thereafter, the cooled billet is heated and extracted at 950 to 1050° C. When the billet extraction temperature is less than 950° C., rolling properties are lowered, and when the billet extraction temperature exceeds 1050° C., rapid cooling is required for rolling, so it may be difficult to control cooling and it may be difficult to secure good product quality by generating cracks, or the like.

Thereafter, the extracted billet is subjected to secondary hot rolling to obtain a steel wire rod. The secondary hot rolling is preferably a ball rolling to have the billet in the shape of a steel wire rod. The secondary hot rolling may include operations of performing intermediate finishing rolling of the extracted billet and performing finishing rolling above a critical deformation amount expressed by the following relational expression at 730° C. to Ae3. [Relational expression 1] critical deformation amount=$-2.46\ Ceq^2+3.11\ Ceq-0.39$ (where, Ceq=C+Mn/6+Cr/5, wherein C, Mn, and Cr are expressed by weight %).

A rolling rate of a steel wire rod is very fast and belongs to a dynamic recrystallization region. Research results up to date have indicated that the austenite grain size depends only on a strain rate and a strain temperature under dynamic recrystallization conditions. Due to the characteristics of wire rolling, when a wire diameter is determined, an amount of deformation and a deformation rate are determined, so the austenite grain size can be changed by adjusting the deformation temperature. In the present disclosure, crystal grains are refined by using a dynamic deformation organic transformation phenomenon during dynamic recrystallization. In order to secure the ferrite grains to be obtained by the present disclosure by using this phenomenon, it is preferable to control a finishing rolling temperature to 730° C.-Ae3. When the finishing rolling temperature exceeds Ae3, it may be difficult to obtain sufficient spheroidizing heat treatment properties because it is difficult to obtain the ferrite grains to be obtained by the present disclosure, and when the temperature is less than 730° C., an equipment load may increase and an equipment life may be sharply reduced.

In addition, in the case of performing finishing rolling with less than the critical deformation amount expressed by the above relational expression 1, the forging amount is not sufficient, so it is difficult to sufficiently refine the average aspect ratio of cementite and the average grain size of ferrite in the central region of the steel wire rod, such that the spheroidizing heat treatment property of the steel wire rod thus obtained may be lowered.

Meanwhile, after the intermediate finishing rolling, an average size of the austenite grains of the steel wire rod is preferably 5-20 μm. Ferrite is known to grow by nucleation at an austenite grain boundary. Since, when the austenite grain, which is a mother phase, is fine, ferrite nucleated at the grain boundaries can also start to be manufactured finely, by controlling the average size of the austenite grains of the steel wire rod after the intermediate finishing rolling, an effect of refining the ferrite grains can be obtained. When the average grain size of austenite exceeds 20 μm, it may be difficult to obtain an effect of refining the ferrite grains, and in order to obtain the average size of the austenite grains of less than 5 μm, there may be a disadvantage in which a separate facility is required to additionally apply a high amount of deformation such as under pressure.

In the microsegregation portion, segregation of more than twice the average of the steel wire rod may be formed, which may cause a low-temperature structure to be generated even at a low cooling rate, thereby adversely affecting the structure homogenization of the steel. Meanwhile, the steel wire rod cooling rate is more preferably 0.5 to 2° C./sec in terms of ferrite grain refinement.

MODE FOR INVENTION

Hereinafter, the present disclosure will be described in more detail through examples. However, it should be noted that the following examples are for illustrative purposes only and are not intended to limit the scope of the present disclosure. The scope of the present disclosure may be determined by matters described in the claims and matters able to be reasonably inferred therefrom.

Embodiment

By casting using a 50 kg vacuum induction melting furnace, a steel material having an alloy composition shown in Table 1 were prepared. The steel material was heated at 1230° C. for 480 minutes, air-cooled to 300° C., and then cooled to room temperature at a cooling rate of 10° C./sec to prepare a billet. A steel wire rod was prepared from the prepared billet under the conditions shown in Table 2 below. For the steel wire rod prepared as described above, after measuring a microstructure, an average grain size of ferrite, and an average aspect ratio of cementite after spheroidizing heat treatment is performed once, the results thereof were shown in Table 3 below.

After intermediate finishing rolling, an average grain size of austenite (AGS) was measured through a cutting crop performed before finishing rolling.

Ae3 displayed values calculated using a JmatPro, a commercial program.

The average grain size of ferrite (FGS) was measured at 3 arbitrary points in a region at a ⅖-⅗ point from a diameter of a specimen collected after removing an uncooled portion after rolling the steel wire rod, which was expressed as the average value.

As for the average aspect ratio of cementite, 10 arbitrary points were selected from the same point as in the FGS measurement, a (long axis+short axis)/2 value of each colony was obtained, and then an average value of colony sizes was obtained.

Meanwhile, a spheroidizing heat treatment was directly performed on the specimen of the steel wire rod prepared as described above without a separate processing process. In this case, the spheroidizing heat treatment was performed by being heated to 760° C. at a heating rate of 100° C./Hr, maintained for 4 to 6 hours, cooled to 730° C. at a cooling rate of 50° C./Hr, and then cooled at a cooling rate of 10° C./Hr in a section between 730° C. and 670° C., and then maintained furnace cooling at a temperature, lower than that. After spheroidizing heat treatment is performed, the average aspect ratio of cementite was imaged in 3 fields of view of ¼-½ point in a diameter direction of the steel wire rod, and a long/short axis of cementite in the field of view was automatically measured using an image measurement program, and then was measured through statistical processing.

TABLE 1

| Steel No. type | Alloy composition (weight %) | | | | | | | | | |
| --- | --- | --- | --- | --- | --- | --- | --- | --- | --- | --- |
| | C | Si | Mn | Cr | P | S | Ti | B | Al | N |
| IS 1 | 0.32 | 0.21 | 1.2 | 0.45 | 0.018 | 0.006 | 0.015 | 0.002 | 0.03 | 0.004 |
| IS 2 | 0.36 | 0.2 | 1.15 | 0.51 | 0.015 | 0.006 | 0.018 | 0.003 | 0.02 | 0.005 |
| IS 3 | 0.43 | 0.15 | 1.3 | 0.38 | 0.01 | 0.008 | 0.025 | 0.0015 | 0.04 | 0.003 |
| IS 4 | 0.38 | 0.25 | 1.18 | 0.62 | 0.011 | 0.003 | 0.015 | 0.0015 | 0.03 | 0.005 |
| CS 1 | 0.34 | 0.54 | 1.05 | 0.6 | 0.016 | 0.004 | 0.023 | 0.002 | 0.03 | 0.004 |
| CS 2 | 0.43 | 0.56 | 1.22 | 0.43 | 0.013 | 0.005 | 0.014 | 0.0018 | 0.03 | 0.004 |

TABLE 1

| Steel No. type | Alloy composition (weight %) | | | | | | | | | |
| --- | --- | --- | --- | --- | --- | --- | --- | --- | --- | --- |
| | C | Si | Mn | Cr | P | S | Ti | B | Al | N |
| IS 1 | 0.32 | 0.21 | 1.2 | 0.45 | 0.018 | 0.006 | 0.015 | 0.002 | 0.03 | 0.004 |
| IS 2 | 0.36 | 0.2 | 1.15 | 0.51 | 0.015 | 0.006 | 0.018 | 0.003 | 0.02 | 0.005 |

TABLE 1-continued

| Steel No. | Alloy composition (weight %) | | | | | | | | | |
|---|---|---|---|---|---|---|---|---|---|---|
| type | C | Si | Mn | Cr | P | S | Ti | B | Al | N |
| IS 3 | 0.43 | 0.15 | 1.3 | 0.38 | 0.01 | 0.008 | 0.025 | 0.0015 | 0.04 | 0.003 |
| IS 4 | 0.38 | 0.25 | 1.18 | 0.62 | 0.011 | 0.003 | 0.015 | 0.0015 | 0.03 | 0.005 |
| CS 1 | 0.34 | 0.54 | 1.05 | 0.6 | 0.016 | 0.004 | 0.023 | 0.002 | 0.03 | 0.004 |
| CS 2 | 0.43 | 0.56 | 1.22 | 0.43 | 0.013 | 0.005 | 0.014 | 0.0018 | 0.03 | 0.004 |

TABLE 2

| Classification | Steel type No. | Billet extraction temperature (° C.) | AGS after intermediate finishing rolling (μm) | Ae3 (° C.) | Finishing rolling temperature (° C.) | Critical deformation amount | Finishing rolling deformation amount | Cooling stop temperature of steel wire rod (° C.) | Cooling rate of steel wire rod (° C.)/sec |
|---|---|---|---|---|---|---|---|---|---|
| IE 1 | IS 1 | 1032 | 12 | 792 | 742 | 0.61 | 0.82 | 0.82 | 0.8 |
| IE 2 | IS 2 | 1025 | 11 | 783 | 755 | 0.65 | 0.75 | 0.75 | 1.2 |
| IE 3 | IS 3 | 1034 | 14 | 766 | 764 | 0.72 | 0.92 | 0.92 | 0.9 |
| IE 4 | IS 4 | 1043 | 13 | 801 | 760 | 0.64 | 0.75 | 0.75 | 1.5 |
| IE 5 | IS 1 | 1021 | 12 | 778 | 752 | 0.72 | 0.85 | 0.85 | 1.8 |
| IE 6 | IS 2 | 1030 | 12 | 780 | 770 | 0.61 | 0.84 | 0.84 | 0.9 |
| CE 1 | CS 1 | 1024 | 12 | 792 | 802 | 0.61 | 0.43 | 0.43 | 0.4 |
| CE 2 | CS 2 | 1031 | 24 | 783 | 823 | 0.65 | 0.63 | 0.63 | 0.3 |
| CE 3 | CS 3 | 1034 | 22 | 766 | 790 | 0.72 | 0.48 | 0.48 | 1.5 |
| CE 4 | CS 4 | 1035 | 21 | 801 | 835 | 0.64 | 0.55 | 0.55 | 2.0 |
| CE 5 | CS 1 | 1011 | 15 | 778 | 804 | 0.72 | 0.52 | 0.52 | 2.4 |
| CE 6 | CS 2 | 1028 | 18 | 780 | 816 | 0.61 | 0.55 | 0.55 | 3.0 |

Critical deformation amount = $-2.46 Ceq^2 + 3.11 Ceq - 0.39$ (where, $Ceq = C + Mn/6 + Cr/5$, wherein C, Mn, and Cr are expressed by weight %)

TABLE 3

| Classification | Microstructure (area %) | | | Average grain size of ferrite (μm) | Average aspect ratio of cementite | Average aspect ratio of cementite after spheroidizing heat treatment |
|---|---|---|---|---|---|---|
| | F | P | B + M | | | |
| IE 1 | 57 | 41 | 2 | 3.8 | 29 | 2.1 |
| IE 2 | 53 | 47 | 0 | 4.5 | 32 | 2.3 |
| IE 3 | 51 | 45 | 4 | 4.8 | 27 | 2.4 |
| IE 4 | 53 | 45 | 2 | 4.3 | 33 | 2.2 |
| IE 5 | 56 | 42 | 2 | 4.7 | 30 | 2.4 |
| IE 6 | 52 | 46 | 2 | 4.6 | 31 | 2.2 |
| CE 1 | 47 | 51 | 2 | 9.4 | 36 | 3.1 |
| CE 2 | 32 | 66 | 2 | 11 | 37 | 2.8 |
| CE 3 | 46 | 52 | 2 | 9.5 | 35 | 3.3 |
| CE 4 | 34 | 64 | 2 | 12 | 42 | 2.9 |
| CE 5 | 48 | 50 | 2 | 11 | 44 | 3.1 |
| CE 6 | 35 | 63 | 2 | 11 | 42 | 3.3 |

F: ferrite,
P: pearlite,
B: bainite,
M: martensite

As can be seen from the Tables 1 to 3 above, in the case of Inventive Examples 1 to 6 satisfying the alloy composition and manufacturing conditions proposed by the present disclosure, it can be seen that the microstructure type and the fraction of the present disclosure and also fine grains were secured, such that, with only the spheroidization heat treatment performed once, the average aspect ratio of cementite was 2.5 or less.

However, in Comparative Examples 1 to 6 which did not satisfy the alloy composition or manufacturing conditions suggested in the present disclosure, it is indicated that the microstructure type and the fraction of the present disclosure were not satisfied, or fine grains were not secured, such that the cementite average aspect ratio was relatively high when the spheroidization heat treatment was performed once, and accordingly, to be applied to a final product, additional spheroidization heat treatment may be necessary.

The invention claimed is:

1. A steel wire rod having excellent spheroidizing heat treatment properties, comprising, by weight %:
    0.3-0.5% of C, 0.02-0.4% of Si, 1.0-1.5% of Mn, 0.3-0.7% of Cr, 0.003% or less (excluding 0%) of B, less than 0.03% (excluding 0%) of Ti, 0.03% or less (including 0%) of P, 0.01% or less (including 0%) of S, 0.02-0.05% of Al, 0.001-0.01% of N, and a balance of Fe and inevitable impurities,
    wherein a microstructure is a complex structure having a main phase of ferrite+pearlite, with one or more of bainite or martensite accounting for 5 area % or less (including 0%), and has an average aspect ratio of cementite of 35 or less in a region at a ⅖-⅗ point of a diameter.

2. The steel wire rod having excellent spheroidizing heat treatment properties of claim 1, wherein a fraction of the ferrite is 50 area % or more.

3. The steel wire rod having excellent spheroidizing heat treatment properties of claim 1, wherein the steel wire rod has an average grain size of ferrite of 5 μm or less in the region of the ⅖ to ⅗ point of the diameter.

4. The steel wire rod having excellent spheroidizing heat treatment properties of claim 1, wherein the steel wire rod has an average aspect ratio of cementite of 2.5 or less after spheroidizing heat treatment is performed once.

5. A method for manufacturing a steel wire rod having excellent spheroidizing heat treatment properties, the method comprising operations of:
preparing a billet including, by weight %, 0.3-0.5% of C, 0.02-0.4% of Si, 1.0-1.5% of Mn, 0.3-0.7% of Cr, 0.003% or less (excluding 0%) of B, less than 0.03% (excluding 0%) of Ti, 0.03% or less (including 0%) of P, 0.01% or less (including 0%) of S, 0.02-0.05% of Al, 0.001-0.01% of N, and a balance of Fe and inevitable impurities;
heating the billet, and then extracting the billet at 950 to 1050° C.;
performing secondary hot rolling on the extracted billet to obtain a steel wire rod; and
cooling the steel wire rod at a rate of 2° C./sec or less,
wherein the secondary hot rolling comprises operations of,
intermediate finishing rolling the extracted billet; and
finishing rolling the billet at 730° C.-Ae3 above a critical deformation amount expressed by the following Relational Equation 1, critical deformation amount=$-2.46\ Ceq^2+3.11\ Ceq-0.39$  [Relational Equation 1]

where, $Ceq=C+Mn/6+Cr/5$, wherein C, Mn, and Cr are expressed by wt %.

6. The method for manufacturing a steel wire rod having excellent spheroidizing heat treatment properties of claim 5, wherein the operation of preparing the billet comprises operations of,
heating a steel material at 1200° C. or higher for 60 minutes or more, and then performing primary hot rolling to obtain a billet;
air cooling the billet to 150 to 500° C.; and
cooling the air-cooled billet to room temperature at a cooling rate of 5 to 30° C./sec.

7. The method for manufacturing a steel wire rod having excellent spheroidizing heat treatment properties of claim 6, wherein, after the steel material is heated, the steel material has an average size of TiN of 500 µm or more.

8. The method for manufacturing a steel wire rod having excellent spheroidizing heat treatment properties of claim 6, wherein the cooled billet comprises 80% or more of TiN among all precipitates excluding oxidative inclusions.

9. The method for manufacturing a steel wire rod having excellent spheroidizing heat treatment properties of claim 5, wherein, after the intermediate finishing rolling, an average grain size of austenite of the steel wire rod is 5 to 20 µm.

* * * * *